(12) United States Patent
Coon et al.

(10) Patent No.: US 12,358,833 B2
(45) Date of Patent: Jul. 15, 2025

(54) BIOACTIVE GLASS COMPOSITIONS

(71) Applicant: Corning Incorporated, Corning, NY (US)

(72) Inventors: Erin Coon, Lewisburg, PA (US); Qiang Fu, Painted Post, NY (US); Alana Marie Whittier, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 787 days.

(21) Appl. No.: 17/610,175

(22) PCT Filed: May 14, 2020

(86) PCT No.: PCT/US2020/032785
§ 371 (c)(1),
(2) Date: Nov. 10, 2021

(87) PCT Pub. No.: WO2020/236501
PCT Pub. Date: Nov. 26, 2020

(65) Prior Publication Data
US 2022/0220022 A1  Jul. 14, 2022

Related U.S. Application Data

(60) Provisional application No. 62/851,335, filed on May 22, 2019.

(51) Int. Cl.
| | |
|---|---|
| *C03C 3/097* | (2006.01) |
| *C03C 4/00* | (2006.01) |
| *C03C 12/00* | (2006.01) |
| *C03C 13/00* | (2006.01) |

(52) U.S. Cl.
CPC ............ *C03C 3/097* (2013.01); *C03C 4/0014* (2013.01); *C03C 4/0021* (2013.01); *C03C 12/00* (2013.01); *C03C 13/00* (2013.01); *C03C 2204/00* (2013.01); *C03C 2213/02* (2013.01)

(58) Field of Classification Search
CPC .. C03C 4/0014; C03C 4/0021; C03C 2213/02
See application file for complete search history.

(56) References Cited

U.S. PATENT DOCUMENTS

| | | |
|---|---|---|
| 3,922,155 A | 11/1975 | Broemer et al. |
| 6,054,400 A | 4/2000 | Brink et al. |
| 6,121,172 A | 9/2000 | Marcolongo et al. |
| 7,329,126 B2 * | 2/2008 | Cook ...................... B24C 11/00 |
| | | 433/215 |
| 2005/0118236 A1 | 6/2005 | Qiu et al. |
| 2005/0142077 A1 * | 6/2005 | Zimmer ................ C03C 4/0021 |
| | | 424/57 |
| 2007/0264291 A1 | 11/2007 | Greenspan et al. |
| 2008/0066495 A1 * | 3/2008 | Moimas ................ A61L 27/306 |
| | | 501/63 |
| 2008/0118579 A1 | 5/2008 | Jarvelainen et al. |
| 2009/0208428 A1 | 8/2009 | Hill et al. |
| 2015/0065329 A1 | 3/2015 | Cornejo et al. |

FOREIGN PATENT DOCUMENTS

| | | | |
|---|---|---|---|
| AU | 2007202221 A1 | 4/2008 | |
| CN | 1917852 A | 2/2007 | |
| CN | 101500622 A | 8/2009 | |
| DE | 2326100 A1 | 12/1974 | |
| EP | 0802890 A1 | 10/1997 | |
| WO | 91/12032 A1 | 8/1991 | |
| WO | 96/21628 A1 | 7/1996 | |
| WO | WO-2006048499 A1 * | 5/2006 | ........... A61K 9/0024 |
| WO | 2012/137158 A1 | 10/2012 | |

OTHER PUBLICATIONS

International Search Report and Written Opinion of the International Searching Authority; PCT/US2020/032785; dated Aug. 7, 2020; 9 pages; European Patent Office.
Fu, Q., et al., "Preparation and bioactive characteristics of a porous 13-93 glass, and fabrication into the articulating surface of a proximal tibia", Journal of Biomedical Materials Research Part A, vol. 82A(1), 2007, pp. 222-229.
Hench LL. J Am Ceram Soc, 1998, 81: 1705-1728.
Jones; "Review of Bioactive Glass: From Hench to Hybrids"; Acta Biomaterialia 9 (2013) pp. 4457-4486.
Miguez-Pacheco et al., "Bioactive glasses beyond bone and teeth: emerging applications in contact with soft tissues", Acta Biomaterialia, vol. 13, 2015, pp. 1-15.
Rahamana et al., "Bioactive glass in tissue engineering", Acta Biomater. Jun. 2011 ; 7(6): pp. 2355-2373.
Wheeler et al., "Evaluation of Particulate Bioglass® in a Rabbit Radius Ostectomy Model", Journal of Biomedical Materials Research, 1997, vol. 35, No. 2, pp. 249-254.
Wheeler, D.L., et al., Effect of bioactive glass particle size on osseous regeneration of cancellous defects. Journal of biomedical materials research, 1998. 41(4): p. 527-533.

(Continued)

*Primary Examiner* — Andrew S Rosenthal
(74) *Attorney, Agent, or Firm* — Travis B. Gasa

(57) ABSTRACT

A silicate-based glass composition includes: 40-60 wt. % $SiO_2$, 0-10 wt. % $B_2O_3$, 0.01-10 wt. % $P_2O_5$, 0-10 wt. % $Al_2O_3$, 0-5 wt. % $Li_2O$, 10-30 wt. % $Na_2O$, 0.01-15 wt. % $K_2O$, 0.01-5 wt. % MgO, 15-30 wt. % CaO, 15-35 wt. % MO, and 15-30 wt. % $R_2O$, such that MO is the sum of MgO, CaO, SrO, BeO, and BaO, and $R_2O$ is the sum of $Na_2O$, $K_2O$, $Li_2O$, $Rb_2O$, and $Cs_2O$.

16 Claims, 6 Drawing Sheets

(56) References Cited

OTHER PUBLICATIONS

Chinese Patent Application No. 202080037371.0, Office Action dated Feb. 7, 2023, 5 pages (English Translation only), Chinese Patent Office.

* cited by examiner

BIOACTIVE GLASS COMPOSITIONS

CROSS-REFERENCE TO RELATED APPLICATIONS

This application claims the benefit of priority under 35 U.S.C. § 371 of International Application No. PCT/US2020/032785, filed on May 14, 2020, which claims the benefit of priority under 35 U.S.C. § 119 of U.S. Provisional Application Ser. No. 62/851,335, filed on May 22, 2019, the contents of each of which are relied upon and incorporated herein by reference in their entirety.

BACKGROUND

1. Field

The disclosure relates to biocompatible inorganic compositions for biomedical applications.

2. Technical Background

Bioactive glasses are a group of glass and glass ceramic materials that have shown biocompatibility or bioactivity, which has allowed them to be incorporated into human or animal physiology. Generally speaking, bioactive glasses are able to bond with hard and soft tissues, thereby fostering growth of bone and cartilage cells. Moreover, bioactive glasses may also enable release of ions which activate expression of osteogenic genes and stimulate angiogenesis, as well as promote vascularization, wound healing, and cardiac, lung, nerve, gastrointestinal, urinary tract, and laryngeal tissue repair.

To meet the requirements for each different application, glasses may be formed as particulates, microspheres, fibers, and scaffolds. However, currently available glasses often suffer from a lack of viscous flow sintering due to devitrification (i.e., crystallization), which limits its ability to sinter into complex shapes (e.g., 45S5 glass), or reduced bioactivity, which prevents effective functionality (e.g., 13-93 glass). Thus, there continues to be an unmet need for bioactive glass compositions having an improved thermal stability, while maintaining excellent bioactivity.

This disclosure presents improved biocompatible inorganic compositions for biomedical applications.

SUMMARY

In some embodiments, a silicate-based glass composition, comprises: 40-60 wt. % $SiO_2$, 0-10 wt. % $B_2O_3$, 0.01-10 wt. % $P_2O_5$, 0-10 wt. % $Al_2O_3$, 0-5 wt. % $Li_2O$, 10-30 wt. % $Na_2O$, 0.01-15 wt. % $K_2O$, 0.01-5 wt. % MgO, 15-30 wt. % CaO, 15-35 wt. % MO, and 15-30 wt. % $R_2O$, wherein MO is the sum of MgO, CaO, SrO, BeO, and BaO, and wherein $R_2O$ is the sum of $Na_2O$, $K_2O$, $Li_2O$, $Rb_2O$, and $Cs_2O$.

In one aspect, which is combinable with any of the other aspects or embodiments, the glass composition further comprises: hydroxyapatite formation within seven days of immersion in simulated body fluid (SBF).

In one aspect, which is combinable with any of the other aspects or embodiments, the hydroxyapatite formation comprises: granular spherical crystals having at least one size dimension in a range of 0.1-10 μm.

In one aspect, which is combinable with any of the other aspects or embodiments, the glass composition has a melting temperature of below 1200° C.

In one aspect, which is combinable with any of the other aspects or embodiments, a difference between a glass transition temperature ($T_g$) of the glass composition and an onset of crystallization temperature ($T_{c,o}$) of at least 200° C.

In one aspect, which is combinable with any of the other aspects or embodiments, the glass composition is a particle, bead, particulate, short fiber, long fiber, woolen mesh, combination thereof.

In one aspect, which is combinable with any of the other aspects or embodiments, the glass composition has at least one size dimension in a range of 1-100 μm.

In one aspect, which is combinable with any of the other aspects or embodiments, the glass composition has at least one size dimension in a range of 1-10 μm.

In one aspect, which is combinable with any of the other aspects or embodiments, the glass composition comprises: 45-55 wt. % $SiO_2$, 2-7 wt. % $P_2O_5$, 10-20 wt. % $Na_2O$, 1-10 wt. % $K_2O$, 1-4 wt. % MgO, and 20-30 wt. % CaO.

In one aspect, which is combinable with any of the other aspects or embodiments, the glass composition is essentially free of at least one of $B_2O_3$, $Al_2O_3$, and $Li_2O$.

In one aspect, which is combinable with any of the other aspects or embodiments, the glass composition comprises 1 wt. % or less of at least one of $B_2O_3$, $Al_2O_3$, and $Li_2O$.

In some embodiments, a matrix comprises a glass composition described herein, wherein the matrix includes at least one of: a toothpaste, mouthwash, rinse, spray, ointment, salve, cream, bandage, polymer film, oral formulation, pill, capsule, or transdermal formulation.

In one aspect, which is combinable with any of the other aspects or embodiments, the glass composition is attached to the matrix or mixed therein.

In some embodiments, an antibacterial composition comprises a glass composition described herein.

In one aspect, which is combinable with any of the other aspects or embodiments, the antibacterial composition further comprises: a culture medium having a pH in a range of 7 to 11.

In one aspect, which is combinable with any of the other aspects or embodiments, the antibacterial composition is colorless or essentially colorless.

BRIEF DESCRIPTION OF THE DRAWINGS

The disclosure will become more fully understood from the following detailed description, taken in conjunction with the accompanying figures, in which.

DETAILED DESCRIPTION

Figure 1:
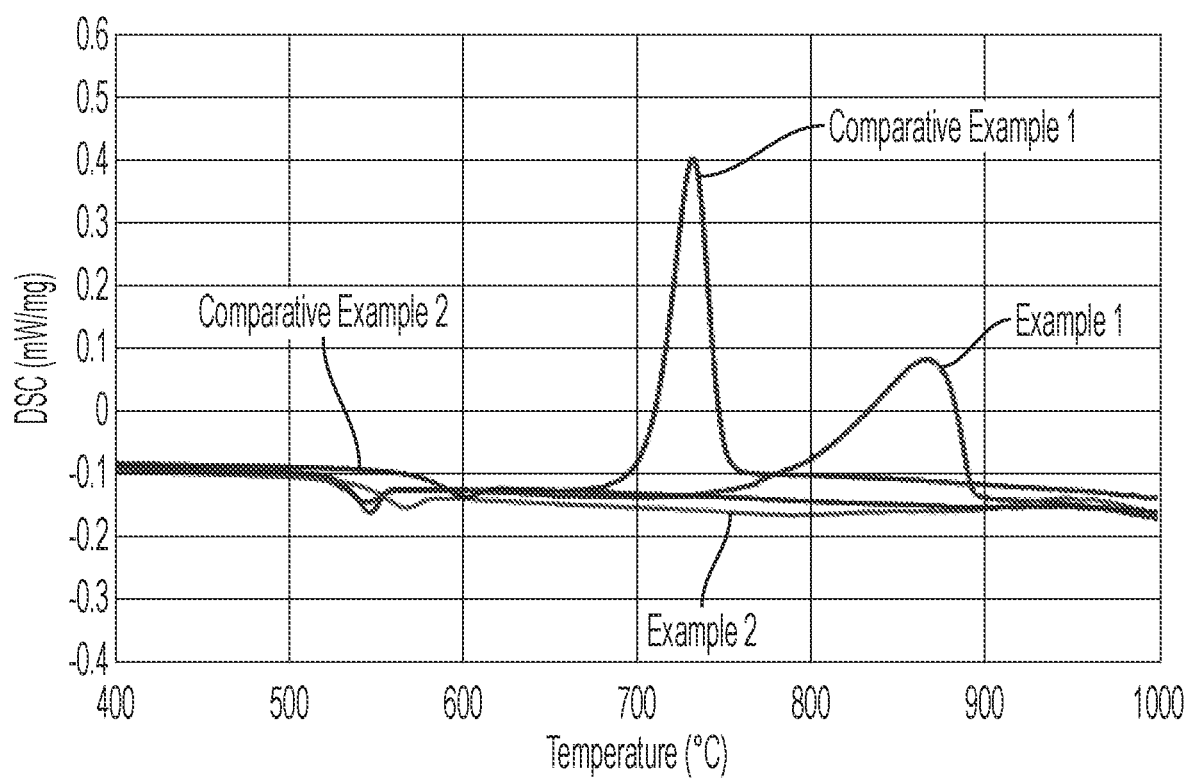
FIG. 1 illustrates differential scanning calorimetry (DSC) scans of Comparative Example 1, Comparative Example 2, Example 1, and Example 2, according to some embodiments.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free" or "essentially free" of $Al_2O_3$ is one in which $Al_2O_3$ is not actively added or batched into the glass, but may be present in very small amounts as a contaminant (e.g., 500, 400, 300, 200, or 100 parts per million (ppm) or less or).

Herein, glass compositions are expressed in terms of wt % amounts of particular components included therein on an oxide bases unless otherwise indicated. Any component having more than one oxidation state may be present in a glass composition in any oxidation state. However, concentrations of such component are expressed in terms of the oxide in which such component is at its lowest oxidation state unless otherwise indicated.

Unless otherwise specified, all compositions are expressed in terms of weight percent (wt %). Coefficients of thermal expansion (CTE) are expressed in terms of $10^{-7}/°$ C., unless otherwise specified. The CTE can be determined, for example, using the procedure described in ASTM E228 "Standard Test Method for Linear Thermal Expansion of Solid Materials with a Push-Rod Dilatometer" or ISO 7991: 1987 "Glass—Determination of coefficient of mean linear thermal expansion." The density in terms of grams/cm$^3$ was measured via the Archimedes method (ASTM C693). Young's modulus, shear modulus, and Poisson's Ratio were measured via the ASTM C623 standard.

The strain point (° C.) and annealing point (° C.) may be measured using a beam bending viscometer (ASTM C598-93), $T_{int}$ (° C.) may be measured using a gradient furnace method (ASTM C829-81). Refractive index at 589.3 nm may be measured using a spectrophotometer.

Glass Compositions

Bioactive glasses are a group of glass and glass ceramic materials that have shown biocompatibility or bioactivity, which has allowed them to be incorporated into human or animal physiology. The biocompatibility and in vivo properties of the glass are influenced by the glass composition. In the glass compositions described herein, $SiO_2$ serves as the primary glass-forming oxide in combination with the bioactive oxides of calcium and phosphorous.

In some examples, the glass comprises a combination of $SiO_2$, $Na_2O$, $P_2O_5$, and CaO. In some examples, the glass further comprises $K_2O$, and/or MgO. In some examples, may further comprise $Al_2O_3$, ZnO $B_2O_3$, and/or $Li_2O$. For example, the glass may comprise a composition including, in wt. %: 40-60 $SiO_2$, 10-30 $Na_2O$, 0.01-10 $P_2O_5$, and 15-30 CaO. In some examples, the glass may further comprise, in wt. %: 0.01-15% $K_2O$ and 0.01-5 MgO. In some examples, the glass may further comprise, in wt. %: 0-10 $Al_2O_3$, 0-10 ZnO, 0-10 $B_2O_3$, and 0-5 $Li_2O$. In some examples, the glass comprises, in wt. %: 15-35 MO and 15-30 $R_2O$, wherein MO is the sum of MgO, CaO, SrO, BeO, and BaO and $R_2O$ is the sum of $Na_2O$, $K_2O$, $Li_2O$, $Rb_2O$, and $Cs_2O$. In other examples, the glass composition comprises 45-55 wt. % $SiO_2$. In some examples, the glass composition comprises 3-10 wt. % $P_2O_5$. The silicate glasses disclosed herein are particularly suitable for biomedical or bioactive applications.

Silicon dioxide ($SiO_2$), which serves as the primary glass-forming oxide component of the embodied glasses, may be included to provide high temperature stability and chemical durability. For the glasses disclosed herein, compositions including excess $SiO_2$ (e.g., greater than 60 wt. %) suffer from decreased bioactivity. Moreover, glasses containing too much $SiO_2$ often also have too high melting temperatures (e.g., greater than 200 poise temperature).

In some embodiments, the glass can comprise 40-60 wt. % $SiO_2$. In some examples, the glass may comprise 45-55 wt. % $SiO_2$. In some examples, the glass can comprise 40-60 wt. %, or 40-50 wt. %, or 42-50 wt. %, or 42-48 wt. %, or 44-48 wt. %, or 50-60 wt. %, or 52-60 wt. %, or 52-58 wt. %, or 54-58 wt. % $SiO_2$, or any value or range disclosed therein. In some examples, the glass is essentially free of $SiO_2$ or comprises 40, 41, 42, 43, 44, 45, 46, 47, 48, 49, 50, 51, 52, 53, 54, 55, 56, 57, 58, 59, 60 wt. % $SiO_2$, or any value or range having endpoints disclosed herein.

Phosphorus pentoxide ($P_2O_5$) also serves as a network former. Furthermore, the liberation of phosphate ions to the surface of bioactive glasses contributes to the formation of apatite. The inclusion of phosphate ions in the bioactive glass increases apatite formation rate and the binding capacity of the bone tissue. In addition, $P_2O_5$ increases the viscosity of the glass, which in turn expands the range of operating temperatures, and is therefore an advantage to the manufacture and formation of the glass. In some examples, the glass can comprise 0.01-10 wt. % $P_2O_5$. In some examples, the glass can comprise 3-10 wt. % $P_2O_5$. In some examples, the glass can comprise 0.01-10 wt. %, or 0.1-10 wt. %, or 0.5-10 wt. %, or 1-10 wt. %, or 1-9 wt. %, or 1-8 wt. %, or 2-7 wt. % $P_2O_5$, or any value or range disclosed therein. In some examples, the glass can comprise about 0.01, 0.1, 0.25, 0.5, 0.75, 1, 2, 3, 4, 5, 6, 7, 8, 9, 10 wt. % $P_2O_5$, or any value or range having endpoints disclosed herein.

Alkali oxides ($Na_2O$, $K_2O$, $Li_2O$, $Rb_2O$, or $Cs_2O$) serve as aids in achieving low melting temperature and low liquidus temperatures. Meanwhile, the addition of alkali oxides can improve bioactivity. Further, $Na_2O$ and $K_2O$ may influence the coefficient of thermal expansion, especially at low temperatures. In some examples, the glass can comprise a total of 15-30 wt. % $Na_2O$ and $K_2O$ combined. In some examples, the glass can comprise a total of 15-30 wt. % $Na_2O$, $K_2O$, $Li_2O$, $Rb_2O$, and $Cs_2O$ combined.

In some examples, the glass can comprise from 10-30 wt. % $Na_2O$. In some examples, the glass can comprise 10-20 wt. % $Na_2O$. In some examples, the glass can comprise 10-30 wt. %, or 10-20 wt. %, or 11-20 wt. %, or 11-19 wt. %, or 12-19 wt. %, or 12-18 wt. %, or 13-18 wt. %, or 13-17 wt. %, or 20-30 wt. %, or 21-30 wt. %, or 21-29 wt. %, or 22-29 wt. %, or 22-28 wt. %, or 23-28 wt. %, or 23-27 wt. % $Na_2O$, or any value or range disclosed therein. In some examples, the glass can comprise about 10, 11, 12, 13, 14, 15, 16, 17, 18, 19, 20, 21, 22, 23, 24, 25, 26, 27, 28, 29, 30 wt. % $Na_2O$, or any value or range having endpoints disclosed herein.

In some examples, the glass can comprise from 0.01-15 wt. % $K_2O$. In some examples, the glass can comprise 1-10 wt. % $K_2O$. In some examples, the glass can comprise 0.01-15 wt. %, or 0.1-12 wt. %, or 0.5-10 wt. %, or 1-10 wt. %, or 1-9 wt. %, or 1-8 wt. %, or 2-8 wt. %, or 3-8 wt. %, or 4-8 wt. %, or 1-5 wt. %, or 5-10 wt. % $K_2O$, or any value or range disclosed therein. In some examples, the glass can comprise about 0.01, 0.1, 0.25, 0.5, 0.75, 1, 2, 3, 4, 5, 6, 7, 8, 9, 10, 11, 12, 13, 14, 15 wt. % $K_2O$, or any value or range having endpoints disclosed herein.

In some examples, the glass can comprise from 0-5 wt. % $Li_2O$. In some examples, the glass can comprise from >0-5 wt. % $Li_2O$. In some examples, the glass can comprise from about >0-2.5 wt. % $Li_2O$. In some examples, the glass can comprise 0-5 wt. %, or >0-5 wt. %, or >0-4.5 wt. %, or >0-4 wt. %, or >0-3.5 wt. %, or >0-3 wt. %, or >0-2.5 wt. %, or 3-5 wt. %, or 3.5-5 wt. %, or 4-5 wt. %, or 4.5-5 wt. % $Li_2O$, or any value or range disclosed therein. In some examples, the glass can comprise about 0, >0, 0.5, 1, 1.5, 2, 2.5, 3, 3.5, 4, 4.5, 5 wt. % $Li_2O$, or any value or range having endpoints disclosed herein.

In some examples, the total amount of the alkalis $Na_2O$, $K_2O$, $Li_2O$, $Rb_2O$, and/or $Cs_2O$ ($R_2O$) is important to the glass properties. In some examples, the glass can comprise 15-30 wt. % $R_2O$, wherein $R_2O$ is the sum of $Na_2O$, $K_2O$, $Li_2O$, $Rb_2O$, and $Cs_2O$. In some examples, the glass can comprise 15-25 wt. % $R_2O$. In some examples, the glass can comprise from 15-30 wt. %, or 15-25 wt. %, or 17-23 wt. %, or 15-20 wt. %, or 20-25 wt. %, or 25-30 wt. % $R_2O$, or any value or range disclosed therein. In some examples, the glass can comprise about 15, 16, 17, 18, 19, 20, 21, 22, 23, 24, 25, 26, 27, 28, 29, 30 wt. % $R_2O$, or any value or range having endpoints disclosed herein.

Divalent cation oxides (such as alkaline earth oxides) also improve the melting behavior and the bioactivity of the glass. Particularly, CaO is found to be able to react with $P_2O_5$ to form apatite when immersed in a simulated body fluid (SBF) or in vivo. The release of $Ca^{2+}$ ions from the surface of the glass contributes to the formation of a layer rich in calcium phosphate. Thus, the combination of $P_2O_5$ and CaO may provide advantageous compositions for bioactive glasses. In some examples, the glass compositions comprise $P_2O_5$ and CaO with the sum of $P_2O_5$ and CaO being from 15-35 wt. %, or 17-35 wt. %, or 17-33 wt. %, or 19-33 wt. %, or 19-31 wt. %, or 21-31 wt. %, or 21-29 wt. %, or 23-29 wt. %, or any value or range disclosed therein. In some examples, the glass compositions comprise $P_2O_5$ and CaO with the sum of $P_2O_5$ and CaO being 15, 16, 17, 18, 19, 20, 21, 22, 23, 24, 25, 26, 27, 28, 29, 30, 31, 32, 33, 34, 35 wt. %, or any value or range having endpoints disclosed herein.

In some examples, the glass can comprise 15-30 wt. % CaO. In some examples, the glass can comprise 20-30 wt. % CaO. In some examples, the glass can comprise from 15-30 wt. %, or 16-30 wt. %, or 16-29 wt. %, or 17-29 wt. %, or 17-28 wt. %, or 18-28 wt. %, or 18-27 wt. %, or 19-27 wt. %, or 19-26 wt. %, or 20-26 wt. %, or 20-25 wt. % CaO, or any value or range disclosed therein. In some examples, the glass can comprise 15, 16, 17, 18, 19, 20, 21, 22, 23, 24, 25, 26, 27, 28, 29, 30 wt. % CaO, or any value or range having endpoints disclosed herein.

In some examples, the glasses comprise MgO. In some examples, the glass can comprise 0.01-5 wt. % MgO. In some examples, the glass can comprise 1-5 wt. % MgO. In some examples, the glass can comprise from >0-5 wt. %, or 0.01-5 wt. %, or 0.5-5 wt. %, or 0.5-4.5 wt. %, or 0.75-4.5 wt. %, or 0.75-4 wt. %, or 1-4 wt. %, or 1-3.5 wt. %, or 1.5-3.5 wt. % MgO, or any value or range disclosed therein. In some examples, the glass can comprise >0, 0.01, 0.5, 0.75, 1, 1.5, 2, 2.5, 3, 3.5, 4, 4.5, 5 wt. % MgO, or any value or range having endpoints disclosed herein.

Strontium oxide (SrO) may be present in some embodiments and in such examples, the glass can comprise from 0-10 wt. % SrO. In some examples, the glass can comprise from >0-10 wt. % SrO. In some examples, the glass can comprise from 3-10 wt. %, 5-10 wt. %, 5-8 wt. % SrO, or any value or range disclosed therein. In some examples, the glass can comprise from 0-10 wt. %, 0-8 wt. %, 0-6 wt. %, 0-4 wt. %, 0-2 wt. %, >0-10 wt. %, >0-8 wt. %, >0-6 wt. %, >0-4 wt. %, >0-2 wt. %, 1-10 wt. %, 1-8 wt. %, 1-6 wt. %, 1-4 wt. %, 1-2 wt. %, 3-8 wt. %, 3-6 wt. %, 3-10 wt. %, 5-8 wt. %, 5-10 wt. %, 7-10 wt. %, or 8-10 wt. % SrO, or any value or range disclosed therein. In some examples, the glass can comprise about >0, 1, 2, 3, 4, 5, 6, 7, 8, 9, or 10 wt. % SrO, or any value or range having endpoints disclosed herein.

Barium oxide (BaO) may be present in some examples and in such examples, the glass can comprise from 0-15 wt. % BaO. In some examples, the glass can comprise from 0-10 wt. %, >0-5 wt. %, 6-13 wt. %, 5-15 wt. %, 7-13 wt. %, 7-11 wt. %, 8-12 wt. % BaO, or any value or range disclosed therein. In some examples, the glass can comprise from 0-15 wt. %, 0-13 wt. %, 0-11 wt. %, 0-9 wt. %, 0-7 wt. %, 0-5 wt. %, >0-15 wt. %, >0-13 wt. %, >0-11 wt. %, >0-9 wt. %, >0-7 wt. %, >0-5 wt. %, 1-15 wt. %, 1-13 wt. %, 1-11 wt. %, 1-9 wt. %, 1-7 wt. %, 1-5 wt. %, 3-15 wt. %, 3-13 wt. %, 3-11 wt. %, 3-9 wt. %, 3-7 wt. %, 3-5 wt. %, 5-15 wt. %, 5-13 wt. %, 5-11 wt. %, 5-9 wt. %, 5-7 wt. %, 7-15 wt. %, 7-13 wt. %, 7-11 wt. %, 7-9 wt. %, 9-15 wt. %, 9-13 wt. %, 9-11 wt. %, 11-15 wt. %, or 11-13 wt. % BaO, or any value or range disclosed therein. In some examples, the glass can comprise about 0, >0, 1, 2, 3, 4, 5, 6, 7, 8, 9, 10, 11, 12, 13, 14, or 15 wt. % BaO, or any value or range disclosed therein.

Alkaline earth oxides may improve other desirable properties in the materials, including influencing the Young's modulus and the coefficient of thermal expansion. In some examples, the glass comprises from 15-35 wt. % MO, wherein MO is the sum of MgO, CaO, SrO, BeO, and BaO. In some examples, the glass comprises 20-30 wt. %, or 20-29 wt. %, or 21-29 wt. %, or 21-28 wt. %, or 22-28 wt. %, or 22-27 wt. %, or 23-27 wt. % MO, or any value or range disclosed therein. In some examples, the glass can comprise about 15, 16, 17, 18, 19, 20, 21, 22, 23, 24, 25, 26, 27, 28, 29, 30, 31, 32, 33, 34, 35 wt. % MO, or any value or range having endpoints disclosed herein.

In some examples, the glass can comprise 0-10 wt. % $B_2O_3$. In some examples, the glass can comprise >0-10 wt. % $B_2O_3$. In some examples, the glass can comprise 0-5 wt. % $B_2O_3$. In some examples, the glass can comprise from 0-10 wt. %, or >0-10 wt. %, or 2-10 wt. %, or 5-10 wt. %, or 0-8 wt. %, or >0-8 wt. %, or 2-8 wt. %, or 5-8 wt. %, or 0-5 wt. %, or >0-5 wt. %, or 2-5 wt. % $B_2O_3$, or any value or range disclosed therein. In some examples, the glass can comprise 0, >0, 1, 2, 3, 4, 5, 6, 7, 8, 9, or 10 wt. % $B_2O_3$, or any value or range having endpoints disclosed herein.

In some examples, the glasses comprise ZnO. In some examples, the glass can comprise 0-10 wt. % ZnO. In some examples, the glass can comprise from 0-5 wt. % ZnO. In some examples, the glass can comprise from >0-10 wt. %, 3-10 wt. %, or 3-8 wt. % ZnO, or any value or range disclosed therein. In some examples, the glass can comprise from 0-10 wt. %, 0-8 wt. %, 0-6 wt. %, 0-4 wt. %, 0-2 wt. %, >0-10 wt. %, >0-8 wt. %, >0-6 wt. %, >0-4 wt. %, >0-2 wt. %, 1-10 wt. %, 1-8 wt. %, 1-6 wt. %, 1-4 wt. %, 1-2 wt. %, 3-8 wt. %, 3-6 wt. %, 3-10 wt. %, 5-8 wt. %, 5-10 wt. %, 7-10 wt. %, or 8-10 wt. % ZnO, or any value or range disclosed therein. In some examples, the glass can comprise about 0, >0, 1, 2, 3, 4, 5, 6, 7, 8, 9, or 10 wt. % ZnO, or any value or range having endpoints disclosed herein.

Alumina ($Al_2O_3$) may influence the structure of the glass and, additionally, lower the liquidus temperature and coefficient of thermal expansion, or, enhance the strain point. In addition to its role as a network former, $Al_2O_3$ (and $ZrO_2$) help improve the chemical durability in silicate glass while having no toxicity concerns. In some examples, the glass can comprise 0-10 wt. % $Al_2O_3$. In some examples, the glass can comprise from 0-10 wt. %, 0-8 wt. %, 0-6 wt. %, 0-4 wt. %, 0-2 wt. %, >0-10 wt. %, >0-8 wt. %, >0-6 wt. %, >0-4 wt. %, >0-2 wt. %, 1-10 wt. %, 1-8 wt. %, 1-6 wt. %, 1-4 wt. %, 1-2 wt. %, 3-8 wt. %, 3-6 wt. %, 3-10 wt. %, 5-8 wt. %, 5-10 wt. %, 7-10 wt. %, or 8-10 wt. % $Al_2O_3$, or any value or range disclosed therein. In some examples, the glass can comprise 0, >0, 1, 2, 3, 4, 5, 6, 7, 8, 9, or 10 wt. % $Al_2O_3$, or any value or range having endpoints disclosed herein.

Additional components can be incorporated into the glass to provide additional benefits or may be incorporated as contaminants typically found in commercially-prepared glass. For example, additional components can be added as coloring or fining agents (e.g., to facilitate removal of gaseous inclusions from melted batch materials used to produce the glass) and/or for other purposes. In some examples, the glass may comprise one or more compounds useful as ultraviolet radiation absorbers. In some examples, the glass can comprise 3 wt. % or less ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In some examples, the glass can comprise from 0 to about 3 wt. %, 0 to about 2 wt. %, 0 to about 1 wt. %, 0 to 0.5 wt. %, 0 to 0.1 wt. %, 0 to 0.05 wt. %, or 0 to 0.01 wt. % ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. The glasses, according to some examples, can also include various contaminants associated with batch materials and/or introduced into the glass by the melting, fining, and/or forming equipment used to produce the glass. For example, in some embodiments, the glass can comprise from 0 to about 3 wt. %, 0 to about 2 wt. %, 0 to about 1 wt. %, 0 to about 0.5 wt. %, 0 to about 0.1 wt. %, 0 to about 0.05 wt. %, or 0 to about 0.01 wt. % $SnO_2$ or $Fe_2O_3$, or combinations thereof.

EXAMPLES

The embodiments described herein will be further clarified by the following examples.

Non-limiting examples of amounts of precursor oxides for forming the embodied glasses are listed in Table 1, along with the properties of the resulting glasses. Strain and anneal points were measured using a beam bending viscometry (BBV) method; refractive indices were measured using a refractometer; coefficients of thermal expansion (CTE) were measured using a dilatometer; internal liquidus temperature ($T_{int}$) was measured using a gradient boat method according to ASTM standards.

TABLE 1

| Oxide (wt. %) | Comparative Example 1 | Comparative Example 2 | Example 1 | Example 2 |
|---|---|---|---|---|
| $SiO_2$ | 45 | 53 | 47.7 | 50.3 |
| $P_2O_5$ | 6 | 4 | 5.3 | 4.7 |
| $Na_2O$ | 24.5 | 6 | 18.3 | 12.2 |
| $K_2O$ | 0 | 12 | 4 | 8 |
| MgO | 0 | 5 | 1.7 | 3.3 |
| CaO | 24.5 | 20 | 23 | 21.5 |
| Strain Point (° C.) | 481.7 | 532.9 | 478.1 | 495.9 |
| Anneal Point (° C.) | 514.8 | 572.3 | 513.5 | 533 |
| Refractive Index (589.3 nm) | 1.562 | 1.554 | 1.56 | 1.5569 |
| CTE ($\times 10^{-7}$/° C.) | 140 | 109 | 132 | 120 |
| $T_{int}$ (° C.) | 1210 | 1140 | 1155 | 1110 |

The glass compositions disclosed herein can be in any form that is useful for the medical and dental processes disclosed. The compositions can be in the form of, for example, particles, powder, microspheres, fibers, sheets, beads, scaffolds, woven fibers.

As shown in Table 1, Examples 1 and 2 may be melted at temperatures below 1300° C., or at temperatures below 1250° C., or at temperatures below 1200° C., thereby making it possible to melt in relatively small commercial glass tanks. Examples 1 and 2 have internal liquidus temperatures ($T_{int}$) at least 50° C. lower (e.g., for Example 1), and for Example 2, 100° C. lower than Comparative Example 1. This suggests that Examples 1 and 2 have a lower tendency to devitrify during melting and reforming processes.

Thermal Stability

Turning now to the figures, FIG. 1 illustrates differential scanning calorimetry (DSC) scans of Comparative Example 1, Comparative Example 2, Example 1, and Example 2. Specifically, the DSC scans were conducted on polished disc samples (6 mm in diameter×0.5 mm thick), with a ramp rate of 5° C./min in an argon (Ar) atmosphere. FIG. 1 shows the improved thermal stability of Examples 1 and 2 over Comparative Example 1. The processing window, defined as the temperature range ($\Delta T$) between the glass transition temperature ($T_g$) and the onset of crystallization ($T_{c,o}$), increased from 178° C. in Comparative Example 1 glass to 270° C. in Example 1. No detectable crystallization peak was measured for Example 2, suggesting an even better thermal stability than Example 1. A larger process window indicates a better ability of the composition to maintain its amorphous nature upon being subjected to a thermal treatment or a sintering process, which is needed to form the glass particles into complex shapes or structures for biomedical applications. Both Examples 1 and 2 are better than Comparative Example 1 in this regard; in fact, Example 2 shows no sign of crystallization in DSC.

Figure 2:
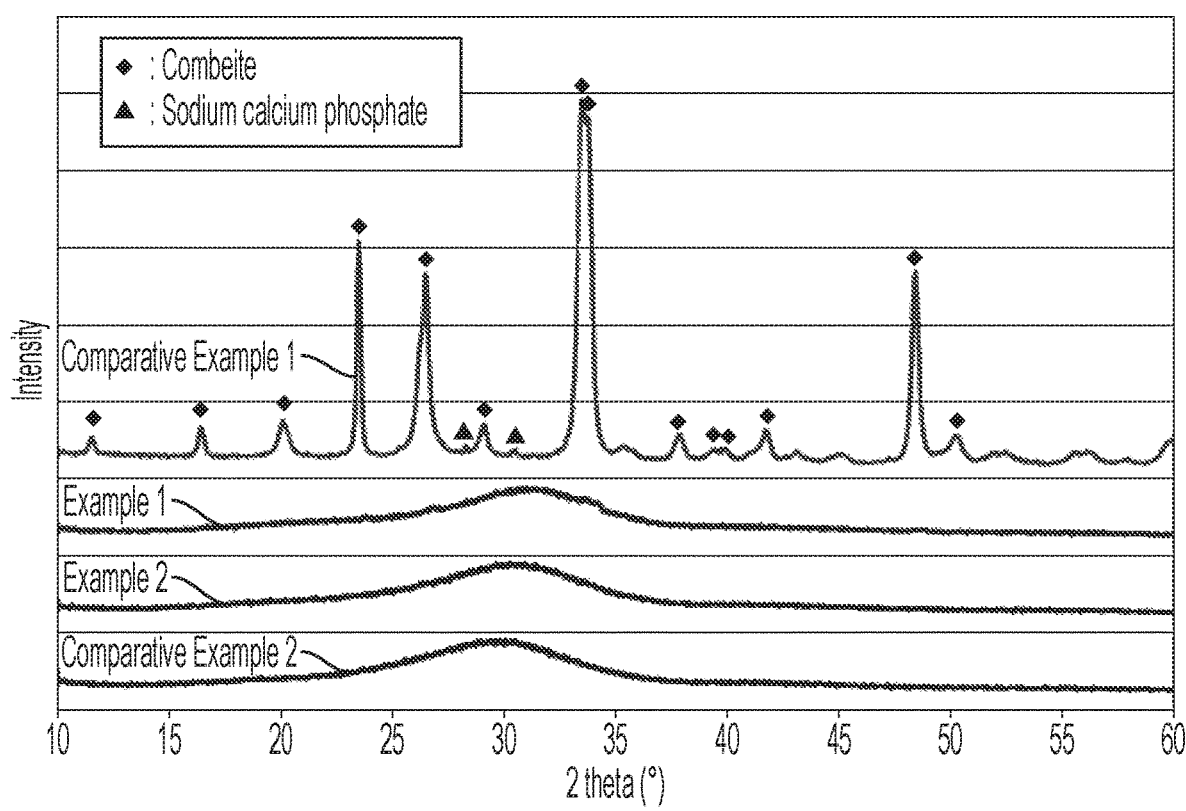
FIG. 2 illustrates powder x-ray diffraction (XRD) plots of Comparative Example 1, Comparative Example 2, Example 1, and Example 2 after heat treatment at 700° C. for 1 hr, according to some embodiments.

Larger process windows (i.e., difference ($\Delta T$) between glass transition temperature ($T_g$) and the onset of crystallization ($T_{c,o}$)) and decreased tendencies to crystallize are important factors for processing glass into desired forming factors (such as 3-D constructs). Both Example 1 and Example 2 show a larger process window than Comparative Example 1 glass, indicating their better ability to maintain its glassy state upon sintering into complex structures such as 3-D scaffolds. FIG. 2 illustrates powder x-ray diffraction (XRD) plots of Comparative Example 1, Comparative Example 2, Example 1, and Example 2 after heat treatment at 700° C. for 1 hr and shows excellent thermal stability of Examples 1 and 2 due to their amorphous nature. No crystalline phase was observed in Example 2, with only a trace amount of combeite in Example 1. In contrast, Comparative Example 1 is a fully crystallized material comprising both combeite and sodium calcium phosphate. The absence of a devitrified (crystalline) phase ensures a low glass viscosity for viscous flow sintering of glass particles into desired complex shapes.

Thus, by FIGS. 1 and 2, Examples 1 and 2 exemplify clear thermal stability advantages over Comparative Example 1. The ability to maintain a glass (amorphous) phase at an elevated temperature is one important factor for processing the glass into complicated structures for a variety of applications through viscous flow sintering processes. In other words, the presence of a crystalline phase during sintering prevents further densification of a glass body, thereby leading to undesirably low mechanical performance.

Glass Bioactivity

Aspects are related to compositions or matrices containing embodied bioactive glass compositions and the methods of using the matrices to treat medical conditions. The matrices can be a toothpaste, mouthwash, rinse, spray, ointment, salve, cream, bandage, polymer film, oral formulation, pill, capsule, transdermal formulation, and the like. The bioactive glass compositions claimed can be physically or chemically attached to matrices or other matrix components, or simply mixed in. As noted above, the bioactive glass can be in any form that works in the application, including particles, beads, particulates, short fibers, long fibers, or woolen meshes. The methods of using the glass-containing matrices to treat a medical condition can be simply like the use of matrix as normally applied.

Figure 3A:
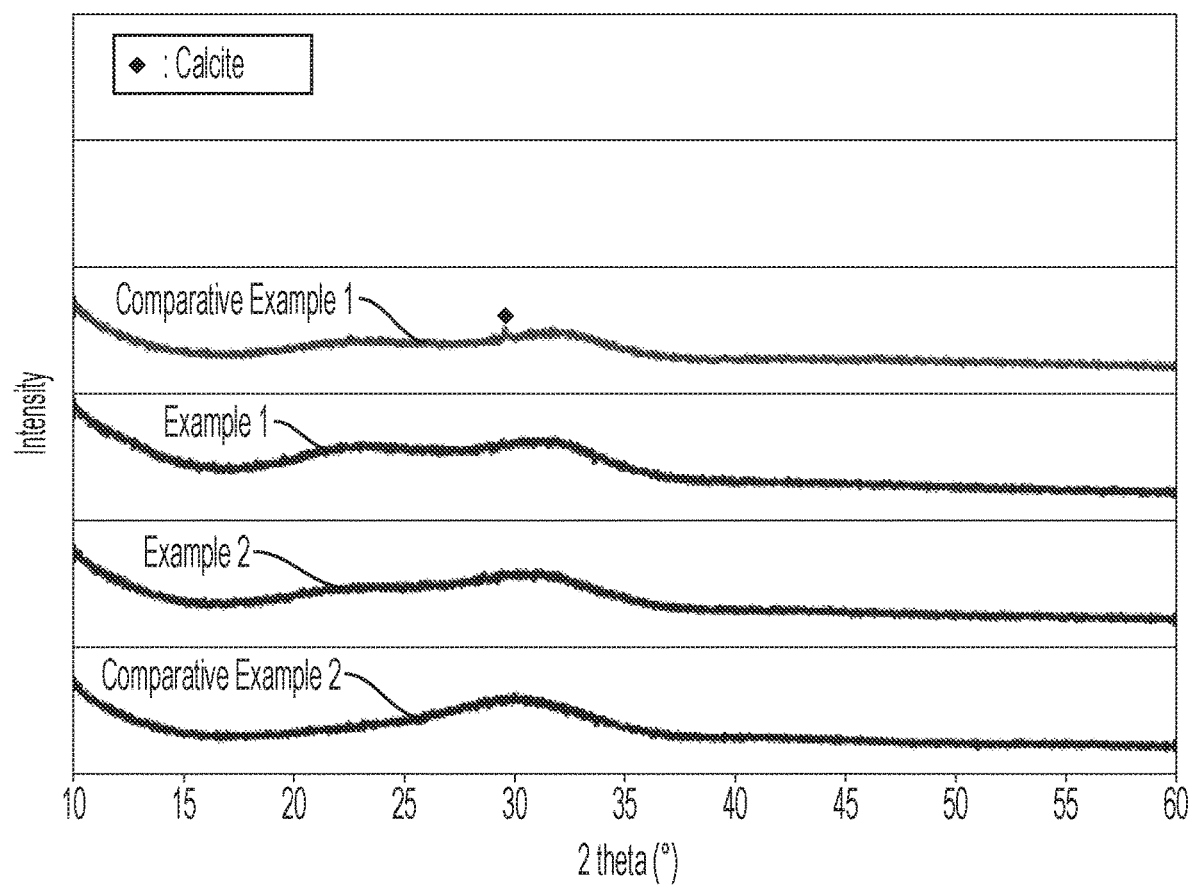
FIGS. 3A to 3C illustrate surface XRD plots of Comparative Example 1, Comparative Example 2, Example 1, and Example 2 after immersion in simulated body fluid (SBF) for 1, 4 and 7 days, respectively, according to some embodiments.
Figure 3B:
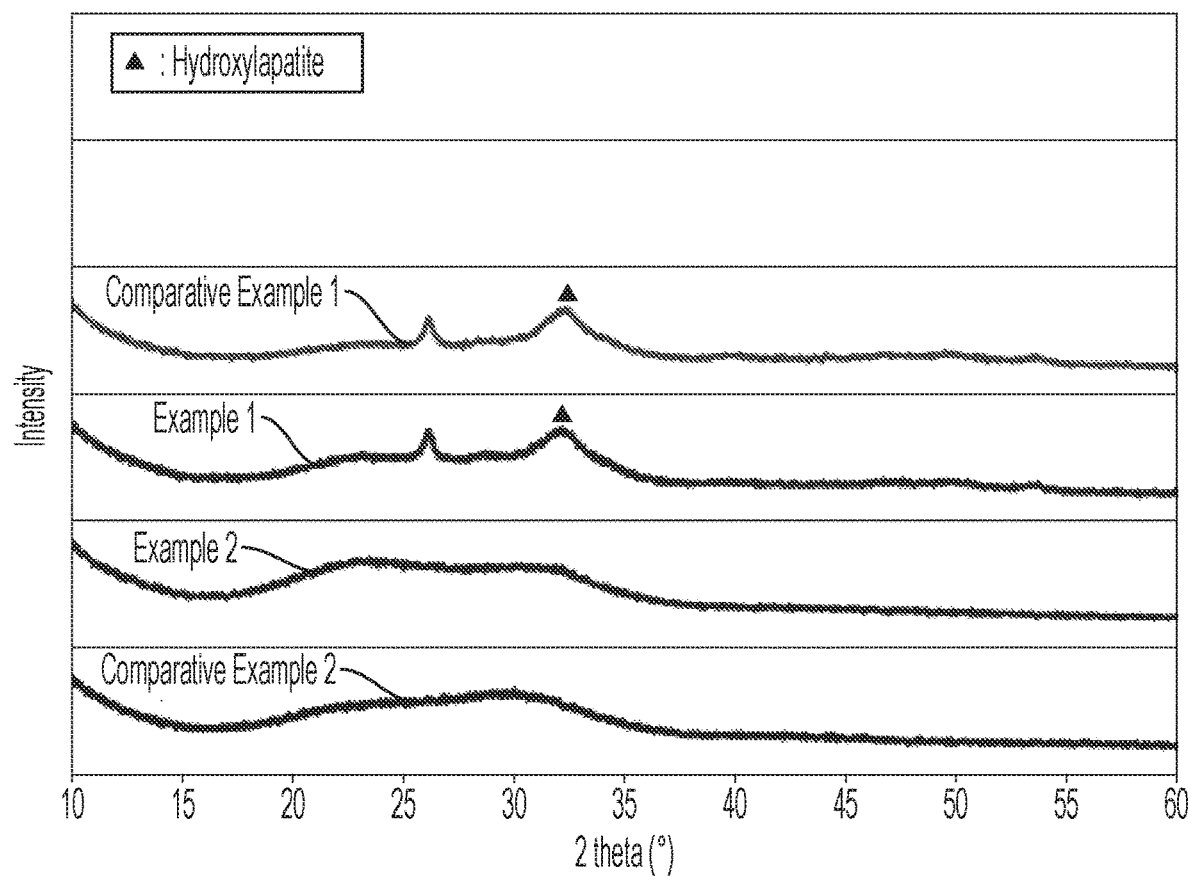
Figure 3C:
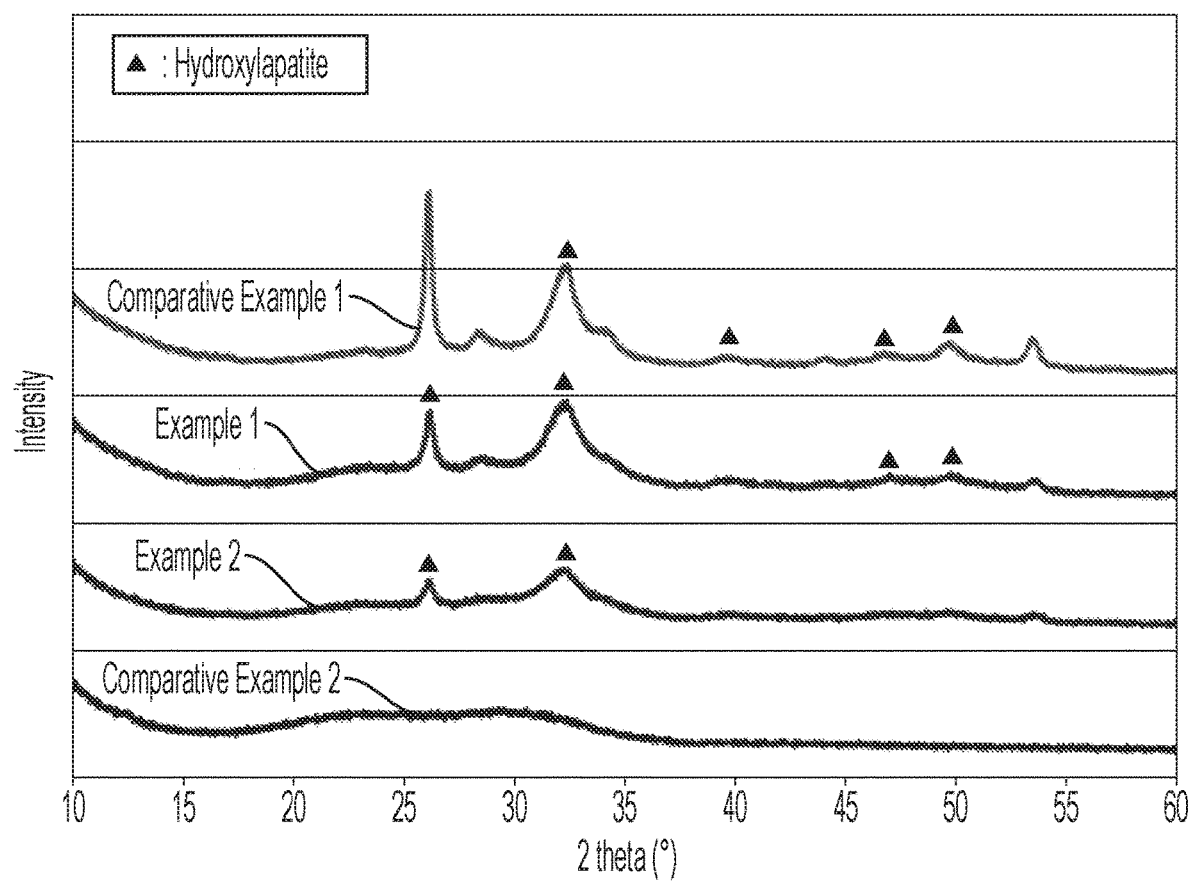
Figure 4A:
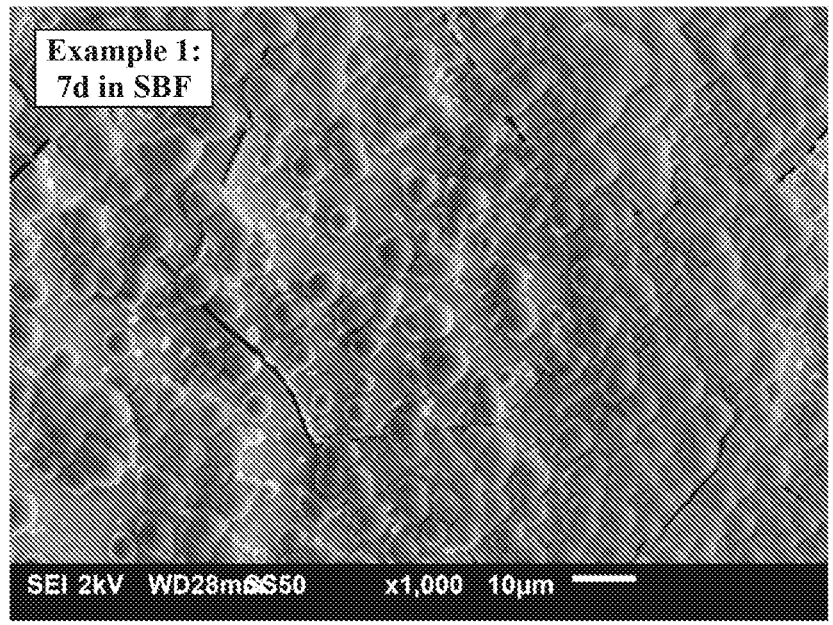
FIGS. 4A and 4B illustrate scanning electron microscopy (SEM) images of Examples 1 and 2 showing formation of granular spherical crystals on surfaces thereof after immersion in SBF for 7 days, according to some embodiments.
Figure 4B:
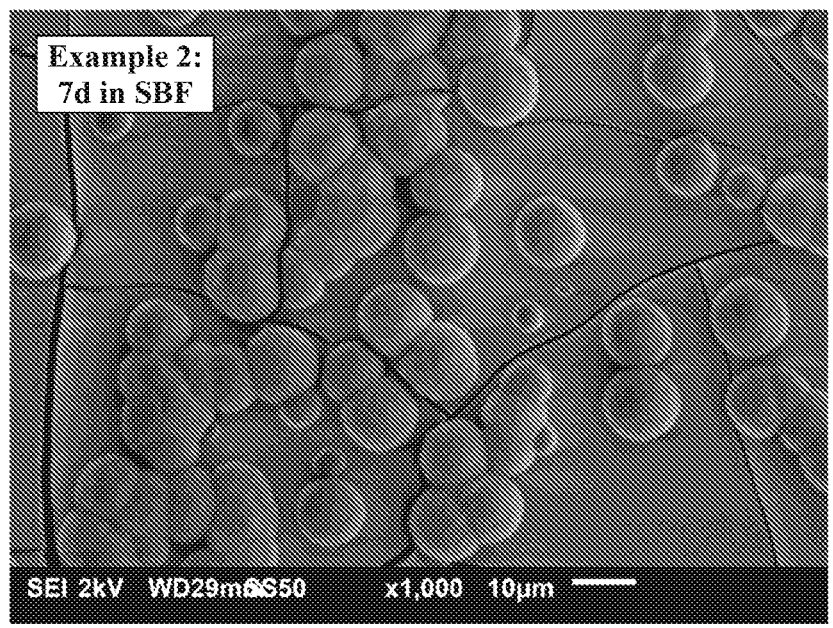

FIGS. 3A to 3C illustrate surface XRD plots of Comparative Example 1, Comparative Example 2, Example 1, and Example 2 after immersion in simulated body fluid (SBF) for 1, 4 and 7 days, respectively, and show how Examples 1 and 2 have improved bioactivity over Comparative Example 2. Example 1 exhibits characteristics of hydroxyapatite formation after four days of immersion in simulated body fluid (SBF) (FIG. 3B), while for Example 2, the same is observed after seven days of immersion in SBF (FIG. 3C). In contrast, no detectable hydroxyapatite is observed on the surface of Comparative Example 2 after immersion in SBF for seven days. Generally, faster hydroxyapatite formation is regarded as a sign for better material bioactivity. Confirmation of hydroxyapatite formation is shown in FIGS. 4A and 4B, which illustrate scanning electron microscopy (SEM) images of Examples 1 and 2, respectively, showing formation of granular spherical crystals (0.1-10 μm) on surfaces thereof after immersion in SBF for seven days.

Glass Making Processes

Glasses having the oxide contents listed in Table 1 can be made via traditional methods. For example, in some examples, the precursor glasses can be formed by thoroughly mixing the requisite batch materials (for example, using a turbular mixer) in order to secure a homogeneous melt, and subsequently placing into silica and/or platinum crucibles. The crucibles can be placed into a furnace and the glass batch melted and maintained at temperatures ranging from 1100° C. to 1400° C. for times ranging from about 6 hours to 24 hours. The melts can thereafter be poured into steel molds to yield glass slabs. Subsequently, those slabs can be transferred immediately to an annealer operating at about 400° C. to 700° C., where the glass is held at temperature for about 0.5 hour to 3 hours and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to 1400° C. and held at temperature for about 6 hours to 16 hours. The resulting glass melts are then poured onto a steel table to cool. The precursor glasses are then annealed at appropriate temperatures.

The embodied glass compositions can be ground into fine particles in the range of 1-10 microns (μm) by air jet milling or short fibers. The particle size can be varied in the range of 1-100 μm using attrition milling or ball milling of glass frits. Furthermore, these glasses can be processed into short fibers, beads, sheets or three-dimensional scaffolds using different methods. Short fibers are made by melt spinning or electric spinning; beads can be produced by flowing glass particles through a hot vertical furnace or a flame torch; sheets can be manufactured using thin rolling, float or fusion-draw processes; and scaffolds can be produced using rapid prototyping, polymer foam replication and particle sintering. Glasses of desired forms can be used to support cell growth, soft and hard tissue regeneration, stimulation of gene expression or angiogenesis.

Continuous fibers can be easily drawn from the claimed composition using processes known in the art. For example, fibers can be formed using a directly heated (electricity passing directly through) platinum bushing. Glass cullet is loaded into the bushing, heated up until the glass can melt. Temperatures are set to achieve a desired glass viscosity (usually <1000 poise) allowing a drip to form on the orifice in the bushing (Bushing size is selected to create a restriction that influences possible fiber diameter ranges). The drip is pulled by hand to begin forming a fiber. Once a fiber is established it is connected to a rotating pulling/collection drum to continue the pulling process at a consistent speed. Using the drum speed (or revolutions per minute RPM) and glass viscosity the fiber diameter can be manipulated—in general the faster the pull speed, the smaller the fiber diameter. Glass fibers with diameters in the range of 1-100 µm can be drawn continuously from a glass melt. Fibers can also be created using an updraw process. In this process, fibers are pulled from a glass melt surface sitting in a box furnace. By controlling the viscosity of the glass, a quartz rod is used to pull glass from the melt surface to form a fiber. The fiber can be continuously pulled upward to increase the fiber length. The velocity that the rod is pulled up determines the fiber thickness along with the viscosity of the glass.

Thus, as presented herein, biocompatible inorganic compositions for biomedical applications are described having a combination of improved thermal stability and bioactivity.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

References herein to the positions of elements (e.g., "top," "bottom," "above," "below," "first," "second," etc.) are merely used to describe the orientation of various elements in the FIGURES. It should be noted that the orientation of various elements may differ according to other exemplary embodiments, and that such variations are intended to be encompassed by the present disclosure. Moreover, these relational terms are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Unless otherwise specified, all compositions are expressed in terms of as-batched weight percent (wt. %). As will be understood by those having ordinary skill in the art, various melt constituents (e.g., silicon, alkali- or alkaline-based, boron, etc.) may be subject to different levels of volatilization (e.g., as a function of vapor pressure, melt time and/or melt temperature) during melting of the constituents. As such, the as-batched weight percent values used in relation to such constituents are intended to encompass values within ±0.5 wt. % of these constituents in final, as-melted articles. With the forgoing in mind, substantial compositional equivalence between final articles and as-batched compositions is expected.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A silicate-based glass composition, comprising:
   47.7-50.3 wt. % $SiO_2$,
   0-10 wt. % $B_2O_3$,
   4.7-5.3 wt. % $P_2O_5$,
   0-10 wt. % $Al_2O_3$,
   0-5 wt. % $Li_2O$,
   12.2-18.3 wt. % $Na_2O$,
   4-8 wt. % $K_2O$,
   1.7-3.3 wt. % MgO,
   21.5-23 wt. % CaO,
   15-35 wt. % MO, and
   15-30 wt. % $R_2O$,
   wherein MO is the sum of MgO, CaO, SrO, BeO, and BaO, and
   wherein $R_2O$ is the sum of $Na_2O$, $K_2O$, $Li_2O$, $Rb_2O$, and $Cs_2O$; and
   wherein a difference between a glass transition temperature ($T_g$) of the glass composition and an onset of crystallization temperature ($T_{c,o}$) is at least 200° C.

2. The glass composition of claim 1, further comprising: hydroxyapatite formation within seven days of immersion in simulated body fluid (SBF).

3. The glass composition of claim 2, wherein the hydroxyapatite formation comprises: granular spherical crystals having at least one size dimension in a range of 0.1-10 µm.

4. The glass composition of claim 1, having a melting temperature of below 1200° C.

5. The glass composition of claim 1, being a particle, bead, particulate, short fiber, long fiber, woolen mesh, combination thereof.

6. The glass composition of claim 5, having at least one size dimension in a range of 1-100 µm.

7. The glass composition of claim 5, having at least one size dimension in a range of 1-10 μm.

8. The glass composition of claim 1, essentially free of at least one of $B_2O_3$, $Al_2O_3$, and $Li_2O$.

9. The glass composition of claim 1, comprising 1 wt. % or less of at least one of $B_2O_3$, $Al_2O_3$, and $Li_2O$.

10. A matrix comprising the glass composition of claim 1, wherein:
the matrix includes at least one of: a toothpaste, mouthwash, rinse, spray, ointment, salve, cream, bandage, polymer film, oral formulation, pill, capsule, or transdermal formulation.

11. The matrix of claim 10, wherein the glass composition is attached to the matrix or mixed therein.

12. An antibacterial composition comprising: a silicate-based glass composition; and
a culture medium having a pH in a range of 7 to 11;
wherein the silicate-based glass composition comprises:
47.7-50.3 wt. % $SiO_2$,
0-10 wt. % $B_2O_3$,
4.7-5.3 wt. % $P_2O_5$,
0-10 wt. % $Al_2O_3$,
0-5 wt. % $Li_2O$,
12.2-18.3 wt. % $Na_2O$,
4-8 wt. % $K_2O$,
1.7-3.3 wt. % MgO,
21.5-23 wt. % CaO,
15-35 wt. % MO, and
15-30 wt. % $R_2O$,
wherein MO is the sum of MgO, CaO, SrO, BeO, and BaO, and
wherein $R_2O$ is the sum of $Na_2O$, $K_2O$, $Li_2O$, $Rb_2O$, and $Cs_2O$; and
wherein the antimicrobial composition is colorless or essentially colorless; and
wherein a difference between a glass transition temperature ($T_g$) of the glass composition and an onset of crystallization temperature ($T_{c,o}$) is at least 200° C.

13. The antibacterial composition of claim 12, wherein the silicate-based glass composition further comprises:
hydroxyapatite formation within seven days of immersion in simulated body fluid (SBF).

14. The antimicrobial composition of claim 13, wherein the hydroxyapatite formation comprises: granular spherical crystals having at least one size dimension in a range of 0.1-10 μm.

15. The antimicrobial composition of claim 12, wherein the silicate-based glass composition comprises a melting temperature of below 1200° C.

16. The antimicrobial composition of claim 12, wherein the silicate-based glass composition is essentially free of at least one of $B_2O_3$, $Al_2O_3$, and $Li_2O$.

* * * * *